United States Patent
Kruglick

(10) Patent No.: US 9,619,240 B2
(45) Date of Patent: Apr. 11, 2017

(54) CORE-LEVEL DYNAMIC VOLTAGE AND FREQUENCY SCALING IN A CHIP MULTIPROCESSOR

(75) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 474 days.

(21) Appl. No.: 13/811,280

(22) PCT Filed: Feb. 4, 2012

(86) PCT No.: PCT/US2012/023896
§ 371 (c)(1),
(2), (4) Date: Jan. 21, 2013

(87) PCT Pub. No.: WO2013/115829
PCT Pub. Date: Aug. 8, 2013

(65) Prior Publication Data
US 2013/0205126 A1    Aug. 8, 2013

(51) Int. Cl.
*G06F 1/00* (2006.01)
*G06F 9/44* (2006.01)
*G06F 1/32* (2006.01)

(52) U.S. Cl.
CPC .......... *G06F 9/4405* (2013.01); *G06F 1/324* (2013.01); *G06F 1/3243* (2013.01);
(Continued)

(58) Field of Classification Search
USPC ....................................................... 713/100
See application file for complete search history.

(56) References Cited

U.S. PATENT DOCUMENTS 7,636,863 B2    12/2009   Oh
7,664,971 B2     2/2010   Oh
(Continued)

FOREIGN PATENT DOCUMENTS

CN    1313559 A    9/2001
CN    1573656 A    2/2005
(Continued)

OTHER PUBLICATIONS

Mohammad Ghasemazar et al., "Minimizing the Power Consumption of a Chip Multiprocessor under an Average Throughput Constraint", 10th Int'l Symposium on Quality Electronic Design on IEEE, 2010, pp. 362-371.

(Continued)

*Primary Examiner* — Robert Cassity
(74) *Attorney, Agent, or Firm* — Ren-Sheng International

(57) ABSTRACT

Techniques described herein generally include methods and systems related to manufacturing a chip multiprocessor having multiple processor cores. An example method may include receiving performance or reliability information associated with each of the multiple processor cores, wherein the received performance or reliability information is determined prior to packaging of the chip multiprocessor, and storing the received performance or reliability information such that stored performance or reliability information is used to adjust an operating parameter of at least one of the multiple processor cores of the chip multiprocessor.

20 Claims, 5 Drawing Sheets

(52) U.S. Cl.
CPC ........ *G06F 1/3296* (2013.01); *Y02B 60/1217* (2013.01); *Y02B 60/1239* (2013.01); *Y02B 60/1285* (2013.01)

(56) References Cited

U.S. PATENT DOCUMENTS

| | | | |
|---|---|---|---|
| 2004/0128567 A1* | 7/2004 | Stewart | 713/300 |
| 2007/0226795 A1 | 9/2007 | Conti et al. | |
| 2008/0012583 A1* | 1/2008 | Audet | G06F 1/26 324/713 |
| 2008/0252308 A1 | 10/2008 | Audet et al. | |
| 2009/0313623 A1* | 12/2009 | Coskun et al. | 718/100 |
| 2010/0100357 A1* | 4/2010 | Harper et al. | 702/187 |
| 2010/0332909 A1* | 12/2010 | Larson | 714/40 |
| 2011/0239017 A1* | 9/2011 | Zomaya | G06F 1/3203 713/320 |

FOREIGN PATENT DOCUMENTS

| | | |
|---|---|---|
| CN | 1659516 A | 8/2005 |
| CN | 1745358 A | 3/2006 |

OTHER PUBLICATIONS

Rajarshi Mukherjee et al., Physical Aware Frequency Selection for Dynamic Thermal Management in Multi-Core Systems, in Proceedings of the 2006 IEEE/ACM International Conference on Computer-Aided Design (ACM 2006), pp. 547-552.

Eric Humenay et al., "Impact of Process Variations on Multicore Performance Symmetry", in Proceedings of the Conference on Design, Automation and Test in Europe, 2007, pp. 1653-1658.

Michael D. Powell et al., "Architectural Core Salvaging in a Multi-Core Processor for Hard-Error Tolerance", in Proceedings of the 36th annual international Symposium on Computer Architecture, ISCA, Jun. 20-24, 2009, pp. 93-104, ACM, Austin, Texas, USA.

Notification of Transmittal of the International Search Report and the Written Opinion of the International Searching Authority, May 25, 2012.

http://www.newegg.com/Product/ProductList.aspx? Submit=ENE &N=50001157&IsNodeId=1&Description=i7&name=Intel &Order=BESTMATCH (captured on WayBack Machine dated Dec. 19, 2011).

http://www.devhardware.com/forums/showthread. php?p=569854#post569854, Jul. 2006.

* cited by examiner

CORE-LEVEL DYNAMIC VOLTAGE AND FREQUENCY SCALING IN A CHIP MULTIPROCESSOR

CROSS-REFERENCE TO RELATED APPLICATION

The present application is a U.S. national stage filing under 35 U.S.C. §371 of International Application PCT/US2012/023896, filed on Feb. 4, 2012 and entitled "CORE-LEVEL DYNAMIC VOLTAGE AND FREQUENCY SCALING IN A CHIP MULTIPROCESSOR." The International Application, including any appendices or attachments thereof, is incorporated by reference herein in its entirety.

BACKGROUND

Unless otherwise indicated herein, the approaches described in this section are not prior art to the claims in this application and are not admitted to be prior art by inclusion in this section.

In keeping with Moore's Law, the number of transistors that can be practicably incorporated into an integrated circuit has doubled approximately every two years. This trend has continued for more than half a century and is expected to continue until at least 2015 or 2020. However, simply adding more transistors to a single-threaded processor no longer produces a significantly faster processor. Instead, increased system performance has been attained by integrating multiple processor cores on a single chip to create a chip multiprocessor and sharing processes among the multiple processor cores of the chip multiprocessor. Furthermore, the multiple processor cores of a chip multiprocessor can share other common system components, which may facilitate the manufacture of a system that is lower in cost and smaller in size compared to multiple single-core processors that collectively may have the same processing performance.

SUMMARY

In accordance with at least some embodiments of the present disclosure, a method for manufacturing a chip multiprocessor having multiple processor cores is generally described. Example methods described herein may include receiving performance or reliability information associated with each of the multiple processor cores, wherein the received performance or reliability information can be determined prior to packaging of the chip multiprocessor. Some described method may also include storing the received performance or reliability information such that the received performance or reliability information can be retrieved and used to adjust one or more operating parameters of one or more of the multiple processor cores of the chip multiprocessor.

In accordance with at least some embodiments of the present disclosure, a method is described for managing the operating frequencies and voltages assigned to processor cores in a chip multiprocessor. Some example methods may include determining computational requirements for a task to be completed by the chip multiprocessor. Based on the determined computational requirements and on stored performance or reliability information associated with each of the processor cores, one or more operating parameters of at least one of the processor cores can be adjusted. In some examples, the stored performance or reliability information can be determined prior to packaging of the chip multiprocessor.

In accordance with at least some embodiments of the present disclosure, a chip multiprocessor is described where the multiprocessor can be formed on a single die. For example, a first processor core, a second processor core, and an on-chip registry can be formed on the die. The on-chip registry can be configured to store performance or reliability information associated with the first processor core and performance or reliability information associated with the second processor core. During operation of the multiprocessor, the stored performance or reliability information can be retrieved from the on-chip registry and various operating parameters of the first and/or the second processor cores can be adjusted.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. The disclosure will be described with additional specificity and detail through use of the accompanying drawings.

DETAILED DESCRIPTION

Figure 1:
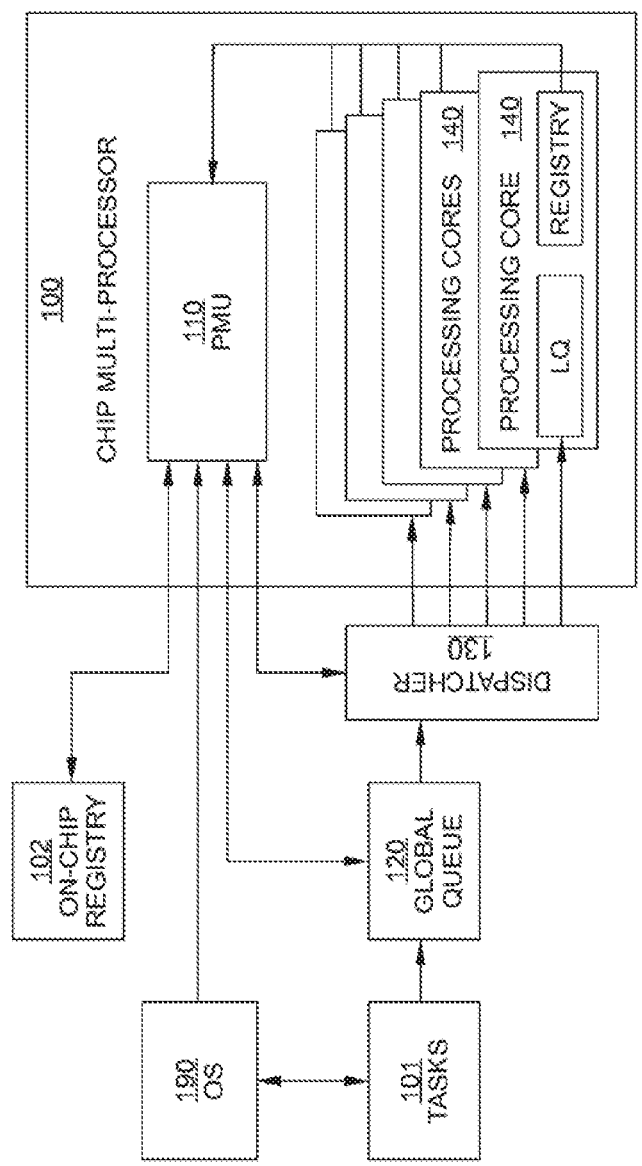
FIG. 1 shows a block diagram of an example embodiment of a chip multiprocessor.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the disclosure, as generally described herein, and illustrated in the Figures, can be arranged, substituted, combined, and designed in a wide variety of different configurations, all of which are explicitly contemplated and make part of this disclosure.

Semiconductor chip manufacturing often includes a sequence of photographic and chemical processing steps during which electronic devices and circuits are gradually created on a wafer made of semiconducting material. The entire manufacturing process, from front-end-of-line processing of a wafer to packaging of chips formed from the wafer, can include hundreds of process steps, each of which may be subject to a certain level of random variation. Consequently, chips that have nominally undergone identical processing, even chips formed from adjacent locations on the same wafer, may have varied performance. The same design, process, and masks may be used for entire wafer runs, but at the end of the manufacturing process each chip is typically subjected to lengthy and complex testing to establish what maximum clock speed (or operating frequency) is considered reliable, so that chips can be binned and sold as different products based on the measured maximum reliable clock speed.

Currently, manufacturers of chip multiprocessors (CMPs) typically assign a single maximum operating frequency for each processor core in a CMP, regardless of core count, and pre-set the CMP die clocked to that maximum operating frequency. Differential voltage frequency scaling (DVFS), i.e., adjustment of the operating frequency and/or operating voltage of a microprocessor during operation, can then be used to manage power use of the CMP to conserve power, reduce heat generation, etc. For a CMP having a low number of processor cores, such an approach may be simple and effective. However, for a CMP with a higher core count, the assumption that all processor cores operate with essentially the same performance and/or reliability parameters can result in significant lost performance and/or unwanted power use by the CMP. These performance losses may occur since the large number of processor cores in a high core-count CMP generally has a wide distribution of maximum operating frequencies and other performance parameters. Therefore, setting the maximum operating frequency of a high core-count CMP to be compatible with the lowest performing processor core in the CMP may prevent the majority of processor cores from being used at their maximum performance levels. With higher core-count CMPs, the distribution of maximum operating frequencies may widen and lost potential performance of such CMPs may increase proportionally.

Embodiments disclosed herein contemplate systems, methods and/or devices for providing core-level performance or reliability information of processor cores to a CMP containing the processor cores. The core-level performance or reliability information for each processor core may be obtained during testing of the CMP that occurs prior to packaging, such as wafer-level testing. Because such pre-packaging testing allows the collection of detailed performance and/or reliability information for each individual processor core and computing submodules of each processor core, such information may convey a more comprehensive characterization of the performance or reliability of the processor cores to a power management unit (PMU) of the CMP. Consequently, during operation the PMU may be configured to manage operating frequency and voltage of each individual processor core according to the unique characteristics thereof. Furthermore, in some embodiments, the PMU may be configured to adjust the usage, operating frequency, and/or operating voltage of the individual processor cores based on the make-up of a specific task assigned to the CMP.

FIG. 1 shows a block diagram of an example embodiment of a chip multiprocessor (CMP) 100, arranged in accordance with at least some embodiments of the present disclosure. CMP 100 is a multi-core processor formed from a single integrated circuit die that can be configured to carry out parallel processing tasks (e.g., process multiple threads) using multiple processor cores formed on the die. CMP 100 may include a power management unit (PMU) 110 and multiple processor cores 140. In addition, CMP 100 may be coupled to a global queue 120 and a dispatcher 130.

PMU 110 may act as the global controller or multicore manager for CMP 100, and may be configured to adjust the working voltage and/or frequency levels of each of the multiple processor cores 140. PMU 110 may be substantially similar in organization and operation to existing PMUs that are configured for CMPs. In some embodiments PMU 110 may be configured to perform DVFS with respect to multiple processor cores 140. Accordingly, PMU 110 may include multiple voltage control devices, each being configured to independently adjust operating voltages applied to each of processor cores 140 as desired. In some examples, PMU 110 may include a DC/DC controller and multiple DC/DC converters. PMU 110 may also include a clock source unit or some other frequency control device that can be configured to dynamically adjust the clock signal provided to each processor core 140 as desired. In the embodiment illustrated in FIG. 1, PMU 110 is disposed on-chip with CMP 100 and therefore may be a component of CMP 100. In other embodiments, PMU 110 may be disposed off-chip from CMP 100.

Several power management approaches have been developed that can be used by PMU 110, covering a wide spectrum of system characteristics, including: high-level operating-system-driven policies, response to predicted usage, dynamic management of processor resources according to activity demands, dynamic scheduling of tasks to processors in a chip multi-processor (CMP) environment, and hardware techniques for DVFS. Other approaches include adaptive body biasing (ABB) and adaptive supply voltage (ASV) implementations.

According to some embodiments, the hardware actuators available for such power management include: joint voltage and frequency scaling, frequency scaling, and microarchitectural switches, e.g., instruction fetch throttling. PMU 110 queries the performance, capabilities, and power of all components at regular time intervals and decides how to best control the available actuators of each component in order to comply with a given power management policy, e.g., a fixed power budget. Algorithms for implementing policies through hardware actuators exist for a single-core and can be used here on CMP 100 thanks to the individual core-level characterization data, i.e., performance/reliability information 145. Two examples of such implementation algorithms suitable for use by PMU 110 for DVFS are MaxBIPS and LinOpt.

The MaxBIPS algorithm assumes a set of discrete power modes (Vdd-frequency pairs), which PMU 110 can control for each of processor cores 140 individually. The goal of such an algorithm is to maximize the overall performance of CMP 100, as measured by the total number of completed instructions by all of processor cores 140 per time period, under a given power budget. The MaxBIPS algorithm relies on the fact that when a given core switches from power mode A (VddA, freqA) in observation window N to power mode B (VddB, freqB) in observation window N+1, the future performance and power is predictable using simple formulas. LinOpt uses linear programming to find the best voltage and frequency levels for each of the cores in the CMP. Previously these formulas have used chipwide estimations of available performance windows. According to some embodiments, these algorithms may be modified to use data such as that provided by the on-chip registries 143 (described below), collected at the core level before processor cores 140 on CMP 100 are packaged.

The performance of an application running on one of processor cores 140, measured in instructions per cycle (IPC), depends on how much time the application spends doing computations versus time spent waiting for memory accesses. The frequency of a particular processor core 140 directly affects computation speed but has little influence on the memory latency associated with the processor core 140. Therefore, the performance of computationally intensive applications is more sensitive to voltage and frequency scaling than that of memory-bound applications. Thus policies for processor cores 140 may be related to what tasks they are running and PMU 110 may have policies delivered by a higher level manager in the architecture such as a computer operating system (OS) 190 or virtual machine manager, which may associate different policies with different processor cores 140 or tasks 101.

According to some embodiments, an observation window used by PMU 110 may be varied. Varying the PMU observation window, when the PM algorithm is run, between 100 µs and 500 µs had only little effect during experiments, so the PMU observation time can be changed with the number of active cores. Additionally, in some embodiments a single PMU 110 can be used for a large CMP 100 because the single PMU can divide observation of multiple processor cores 140 into a series of samples taken at different periods in time. PMU 110 may observe all of processor cores 140 at once, or only observe a subgroup of the multiple processor cores 140 at one time and observe different subgroups of processor cores at different times. According to some embodiments, CMP 100 may include multiple PMUs 110, each of which may be configured to manage a subdomain of CMP 100. For example, in one such embodiment, four PMUs 110 may each manage roughly one quarter of the CMP 100 as a whole. In such embodiments, multiple PMUs 110 may communicate with each other to cooperatively manage global policies, or, alternatively, each PMU 110 may receive policy directed toward its subdomain from a software manager such as a virtual machine manager or OS 190.

Some control systems may find it easier to optimize a reduced number of controls, in which case the subdomain system described above may be used with subdomains grouped by performance/reliability information 145 related to processor cores 140, for example by grouping together processor cores 140 having similar performance/reliability information 145. In some embodiments, such grouping may be defined at the time of pre-package testing and stored in the manner described here for performance/reliability information 145. In other embodiments, such grouping may be performed later in order to simplify management. The grouping may also be used by dispatcher 130, for example by dispersing a set of tasks 101 to processor cores 140 identified by the performance/reliability information 145 to run at lower power than the others.

Global queue 120 may be configured to receive and store incoming tasks from OS 190. Dispatcher 130 is a scheduler module that can be configured to periodically assign tasks 101 in global queue 120 to each of processor cores 140. The functions of dispatcher 130 may be distributed between OS 190 and CMP 100, but for clarity is illustrated as a single element in FIG. 1. In some embodiments, on-chip registries 143 may be located in each of processing cores 140 or otherwise associated respectively with processing cores 140.

For example, in some such embodiments, on-chip registries may be on the same chip as processing cores 140, but not physically part of the processing cores 140 as illustrated in FIG. 1. In other embodiments, an off-chip registry 102 (also shown in FIG. 1) may be disposed external to CMP 100.

Figure 2:
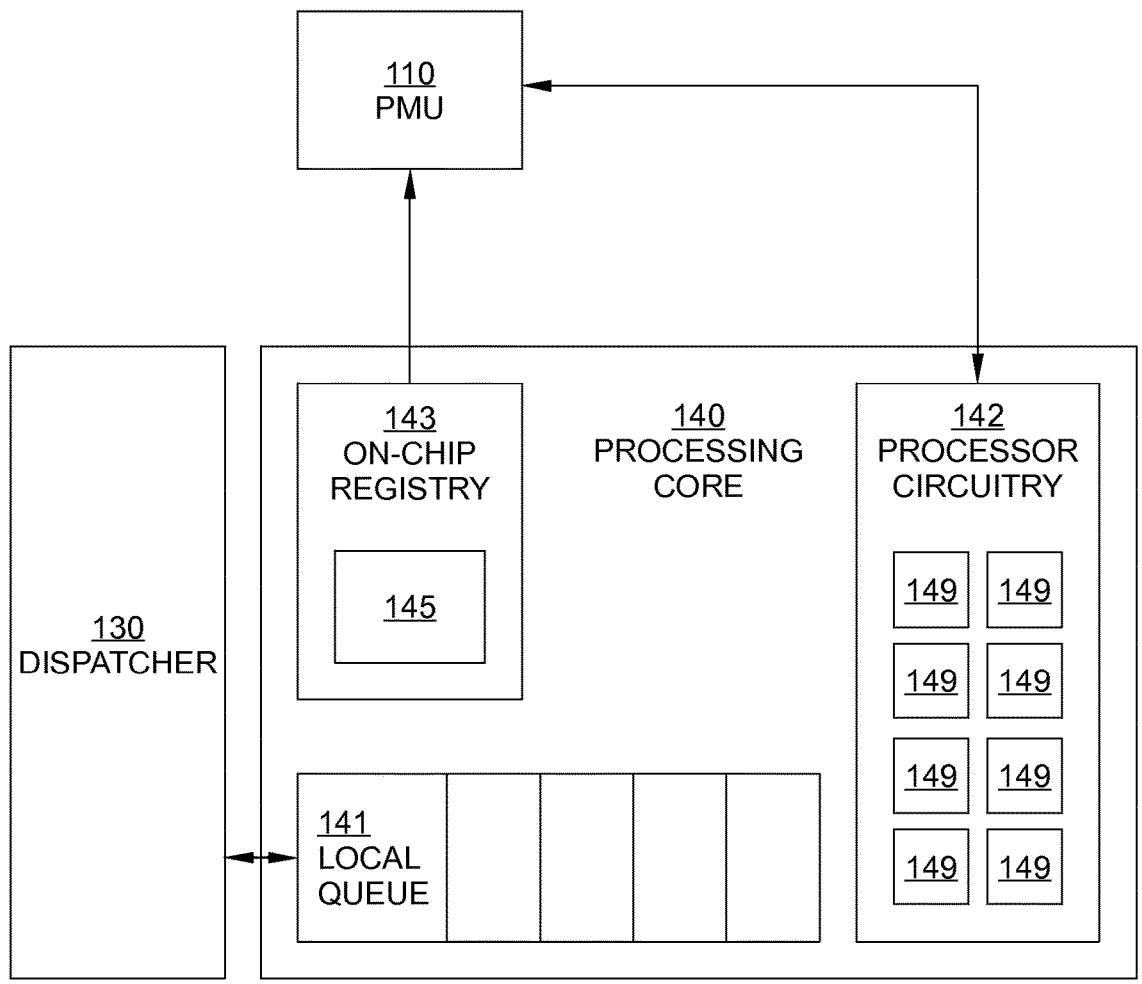
FIG. 2 shows a block diagram of an example embodiment of a processor core.

FIG. 2 shows a block diagram of an example embodiment of one of processor cores 140, arranged in accordance with at least some embodiments of the present disclosure. Processor core 140 may include a local queue 141, processor circuitry 142, and an on-chip registry 143. Local queue 141 may be configured to receive and store tasks 101 that are assigned to processor core 140 by dispatcher 130. Processor circuitry 142 may include various computing submodules 149 of processor core 140 that can be configured to perform the tasks stored in local queue 141. Examples of such computing submodules 149 in processor circuitry 142 may include shifters, adders, cache, memory communications units, bus-processing units, network interfaces, floating point units, arithmetic units, specialty operations units, and the like. On-chip registry 143 is a registry that can be associated with processor core 140 that may be formed as part of the integrated circuit making up processor core 140. In some embodiments, on-chip registry 143 may be configured to store performance/reliability information 145 related to processor core 140, where the stored performance/reliability information 145 can be retrieved by or provided to PMU 110. On-chip registry 143 may be any technically feasible manifestation of registry, including read-only memory (ROM), Programmable ROM (PROM), erasable PROM (EPROM), electrically erasable PROM (EEPROM), a fuse map, flash memory, and the like.

Performance/reliability information 145 may include metrology data that can be measured on processor core 140 prior to packaging of CMP 100, e.g., during a wafer-level test process. Because performance/reliability information 145 may be collected at the wafer level or on diced chips prior to packaging of CMP 100, more test contacts are available than for a packaged die—in some examples up to four times as many. In addition, testing of computer chips prior to packaging may be performed at controlled temperature and with sophisticated test signals and test equipment, and can establish a maximum clock frequency of an integrated circuit at a predetermined reliability, as well as other performance parameters. Due to the additional test contacts available prior to packaging of die, the integrated circuits available for such testing may include each individual processor core 140 and/or each of the computing submodules 149 of each processor core 140. Consequently, in some embodiments, performance/reliability information 145 can include highly detailed, core-level and/or submodule-level information that can be utilized to enable PMU 110 to effectively optimize operating frequency and/or power use of CMP 100 during operation.

In some embodiments, performance/reliability information 145 may include maximum operating voltage and/or clock frequency values associated with the reliable operation of the associated processor core 140. In some embodiments, performance/reliability information 145 may include an average power consumption value and/or a peak power consumption value for each of processor cores 140. In some embodiments, performance/reliability information 145 may further include leakage rate and/or other performance metrics measured across the operating range of the associated processor core 140. In some embodiments, performance/reliability information 145 may be in the form of slope and intercept values for generating a function representing a specific behavior of the processor core 140 of interest, e.g., frequency vs. power use. Alternatively, in some embodiments, performance/reliability information 145 may be in the form of multiple data points that can be used to construct a best-fit curve representing a specific behavior across the operating range of the processor core 140 of interest. In such embodiments, the data points may correspond to performance characteristics measured during testing prior to packaging. Thus, during operation of CMP 100, the unique performance characteristics of each processor core 140 can be provided to PMU 110, thereby facilitating optimal power use and/or frequency of each processor core 140 on a per-core basis.

In some embodiments, performance/reliability information 145 may include performance or reliability information for one or more of the computing submodules 149 and/or other sub-circuits in processor core 140. Specifically, performance/reliability information 145 may include power use, leakage current, etc., for each of computing submodules and/or other sub-circuits in processor core 140, where such information may include individual values or functions defined across the operating range of the processor core. In this way, the unique operating characteristics of each processor core 140 in CMP 100 can be determined, and PMU 110 can tailor the use of each processor core 140 based on said operating characteristics.

For example, in some embodiments, in order to optimize power usage required for a specific task, PMU 110 may be configured to provide input data to dispatcher 130 so that the task can be assigned from global queue 120 to a specific processor core 140. The assignment of the task may be based on the execution instructions contained in the task and on the unique operating characteristics of the processor core 140 being assigned the task. In such embodiments, performance/reliability information 145 may include a frequency slope value and an intercept value for power use for each computing submodule 149 in each processor core 140. A table of such power-use information can be generated (e.g., by PMU 110, OS 190, or dispatcher 130) so that the task, once compiled by OS 190, can be weighted in categories of instructions performed by each computing submodule and subcircuit of a processor core. In this way, an effective metric may be produced whereby the performance of each processor core 140 can be estimated and the compiled task can be assigned to the processor core 140 that is determined to be most suitable for completing the task. In a simple example, given a task with a large number of multiplies, the processor core 140 having the lowest power usage for the multiply operation would be selected to execute the task. In some embodiments, the selection of processor core may be performed by PMU 110. In other embodiments, the selection of processor core may be performed by OS 190 or dispatcher 130.

In operation, CMP 100 may be configured to receive tasks 101 from OS 190 via dispatcher 130. PMU 110 may be configured to operate as the global controller for CMP 100 such that PMU 110 can effectively set the working voltage and frequency levels of each of the multiple processor cores 140. In some embodiments, PMU 110 may be configured to receive performance/reliability information 145 from on-chip registries 143 located in each of processing cores 140. In other embodiments, performance/reliability information 145 may be stored in a single off-chip registry 102. In such embodiments, performance/reliability information 145 may be stored in a remote database that can be accessed by OS 190 (e.g., during an initial boot-up of CMP 100). For example, the remote database may be configured for accessibility via the Internet such that CMP 100 or OS 190 can automatically access the remote database using a unique identifier code associated with CMP 100, where the performance/reliability information 145 may be stored in the remote database. In light of privacy concerns, the unique identifier code may be deleted or blocked by OS 190 after performance/reliability information 145 is received by CMP 100. Alternatively, a non-unique code may be included in a chip ID for CMP 100 which can be used by the remote database to algorithmically reproduce performance/reliability information 145. Other means may also be used to provide performance/reliability information 145 to CMP 100 prior to normal operation.

In embodiments in which CMP 100 may be configured for DVFS, PMU 110 may be configured to dynamically vary the working voltage and/or frequency levels of each of the multiple processor cores 140 dynamically. Although DVFS of multiple cores in a chip multiprocessor is somewhat conventional, the effectiveness of DVFS can be significantly improved by various embodiments described in this disclosure since per-core, pre-packaging test information (i.e., performance/reliability information 145) may be employed to provide a wider reliable operating range for the majority of processor cores 140 in CMP 100 than may typically be available through conventional techniques.

It is noted that information equivalent to performance/reliability information 145 cannot typically be measured after CMP 100 has been packaged. While some indirect measurements and estimates of some core-level performance characteristics can be made using "torture tests" on packaged CMPs and by performing tests on CMPs with only one core activated at a time, such results are inherently less accurate than those described in the present disclosure. In addition, such indirect measurements are largely inaccurate since they do not determine computing submodule or sub-circuit performance, are time-consuming, and inherently conflate multiple performance parameters. Thus, such conventional measurements do not provide comparable information to the core-level information generated by testing of CMPs prior to packaging.

Figure 3:
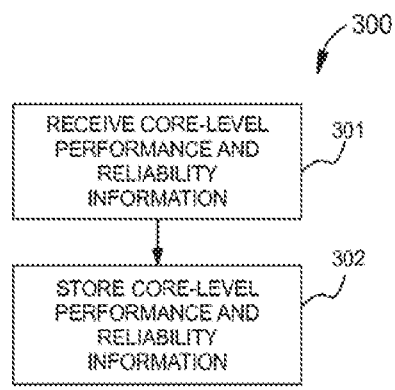
FIG. 3 sets forth a flowchart summarizing an example method for manufacturing a chip multiprocessor having multiple processor cores.

FIG. 3 sets forth a flowchart summarizing an example method 300 for manufacturing a CMP having multiple processor cores, in accordance with at least some embodiments of the present disclosure. Method 300 may include one or more operations, functions or actions as illustrated by one or more of blocks 301 and/or 302. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

For ease of description, method 300 is described in terms of a CMP substantially similar to CMP 100. One of skill in the art will appreciate that method 300 may be performed by other configurations of CMPs and still fall within the scope of the present disclosure. Prior to the first operation of method 300, CMP 100 may be formed on a semiconductor wafer and undergo testing prior to packaging.

The pre-packaging testing may be utilized to produce performance/reliability information 145 associated with each of the individual processor cores 140 included in CMP 100 and, in some embodiments, performance/reliability information 145 for computing submodules 149 and/or other subcircuits of each processor core 140.

Processing for method 300 may begin in operation 301, "receive core-level performance/reliability information." Block 301 may be followed by block 302, "store core-level performance/reliability information."

In operation 301, performance/reliability information 145 associated with each of the multiple processor cores 140 in CMP 100 may be received. It is noted that performance/reliability information 145 may be generated prior to packaging of the multi-core processor, during wafer-level or chip-level testing.

In operation 302, performance/reliability information 145 may be stored so that an operating parameter of at least one of the processor cores 140 can be adjusted during operation of CMP 100. In some embodiments, storing performance/reliability information 145 may include recording the performance or reliability information to either a single off-chip registry 102 or to multiple on-chip registries 143. In other embodiments, a single on-chip registry may be used to store performance/reliability information 145. In yet other embodiments, storing performance/reliability information 145 may include storing performance/reliability information 145 in a database that may be accessible by PMU 110, which may be accessed upon start-up of PMU 110 via OS 190.

In some embodiments, adjusting an operating parameter of at least one of processor cores 140 may include programming PMU 110 to determine one of a power rating, a frequency, and an operating voltage of at least one of the processor cores 140 of CMP 100 based on performance/reliability information 145 previously stored in operation 301. For example, PMU 110 can be configured to use performance/reliability information 145 to optimize a DVFS procedure for reducing power use or increasing processing performance. Specifically, when CMP 100 is determined to have a light processing load, PMU 110 can assign tasks to processor cores 140 known to have lower power consumption. Core-to-core power consumption differences at the same computational performance have been shown in the literature to exceed about 20%, a power savings that can be realized when PMU 110 has the appropriate performance/reliability information 145 available. Similarly, when CMP 100 has a heavy processing load, PMU 110 can direct tasks to processor cores known to have higher computational performance. In addition, because PMU 110 has detailed information regarding performance or reliability of each of processor cores 140, PMU 110 can operate each processor core 140 at an approximately peak frequency, rather than operating all processor cores 140 at a single, nominal peak frequency for CMP 100. As chip multiprocessors are designed with larger numbers of processing cores, the operation of each processing core 140 at an individually measured peak frequency, as described herein, can provide significant improvement in the overall computational performance of CMP 100, e.g., up to about 100%.

Figure 4:
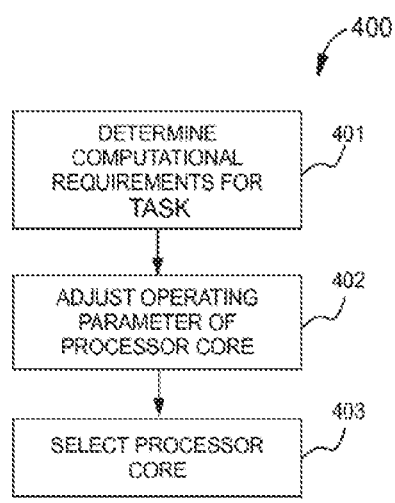
FIG. 4 sets forth a flowchart summarizing an example method for managing frequency and voltage provided to processing cores in a chip multiprocessor.

FIG. 4 sets forth a flowchart summarizing an example method 400 for managing frequency and/or voltage provided to processing cores in a chip multiprocessor, in accordance with at least some embodiments of the disclosure. Method 400 may include one or more operations, functions or actions as illustrated by one or more of blocks 401, 402, and/or 403. Although the blocks are illustrated in a sequential order, these blocks may also be performed in parallel, and/or in a different order than those described herein. Also, the various blocks may be combined into fewer blocks, divided into additional blocks, and/or eliminated based upon the desired implementation.

For ease of description, method 400 is described in terms of a CMP substantially similar to CMP 100. In light of the present disclosure it is appreciated that method 400 may be performed by other configurations of CMP, which fall within the scope of the present disclosure. Prior to the first operation of method 400, performance/reliability information 145 associated with each of the processor cores 140 may be collected during prepackaging testing of CMP 100.

Processing for method 400 may begin in operation 401, "determine computational requirements for task." Operation 401 may be followed by operation 402, "adjust operating parameter of processor core." Operation 402 may be followed by operation 403, "select processor core."

In operation 401, the computational requirements for a task to be completed by CMP 100 may be determined. For example, the execution instructions may be determined to be a low-demand or high-demand task by analyzing the instructions of the task. In some embodiments, the performance of each processor core 140 in executing the task can be estimated based on the make-up of the execution instructions and also based on the unique operating characteristics of each processor core 140. In some embodiments, computational requirements for an instruction may be determined in step 401 by PMU 110 and in other embodiments, by OS 190.

In operation 402, an operating parameter of one or more of processor cores 140 may be adjusted based on the computational requirements determined in operation 401 and on stored performance/reliability information 145 associated with each of the processor cores. In some embodiments, operating parameters adjusted in operation 402 may include optimizing power use and/or clock frequency of one or more of processor cores 140.

In optional operation 403, one or more processor cores 140 may be selected based on performance/reliability information 145. The selected processor core or cores 140 may then be prevented from performing the task. For example, if it is determined in operation 401 that the execution instructions represent a low-demand task, processor cores having high power use, as indicated by performance/reliability information 145, may not be used to execute some or all of the tasks, thereby minimizing power usage of CMP 100.

Figure 5:
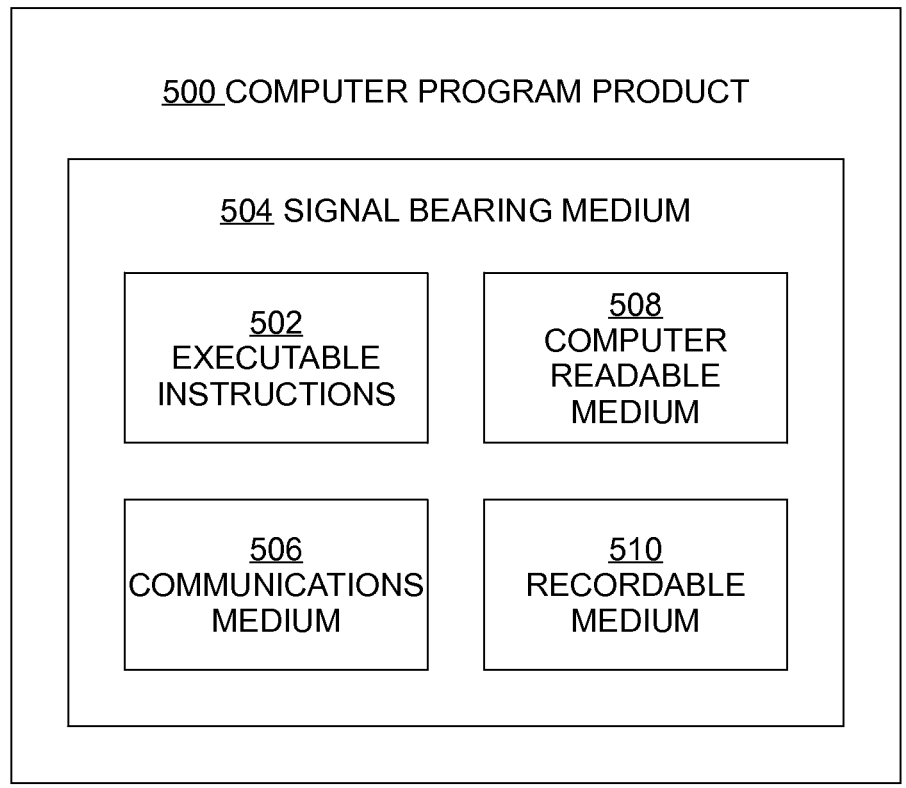
FIG. 5 is a block diagram of an illustrative embodiment of a computer program product for implementing a method for manufacturing a chip multiprocessor having multiple processor cores.

FIG. 5 is a block diagram of an illustrative embodiment of a computer program product 500 for implementing a method for manufacturing a CMP having multiple processor cores, arranged in accordance with at least some embodiments of the present disclosure. Computer program product 500 may include a signal bearing medium 504. Signal bearing medium 504 may include one or more sets of executable instructions 502 that, when executed by, for example, a processor of a computing device, may provide at least the functionality described above with respect to FIG. 3.

In some implementations, signal bearing medium 504 may encompass a non-transitory computer readable medium 508, such as, but not limited to, a hard disk drive, a Compact Disc (CD), a Digital Video Disk (DVD), a digital tape, memory, etc. In some implementations, signal bearing medium 504 may encompass a recordable medium 510, such as, but not limited to, memory, read/write (R/W) CDs, R/W DVDs, etc. In some implementations, signal bearing medium 504 may encompass a communications medium 506, such as, but not limited to, a digital and/or an analog communication medium (e.g., a fiber optic cable, a waveguide, a wired communications link, a wireless communication link, etc.). Computer program product 500 may be recorded on non-transitory computer readable medium 508 or another similar recordable medium 510.

Figure 6:
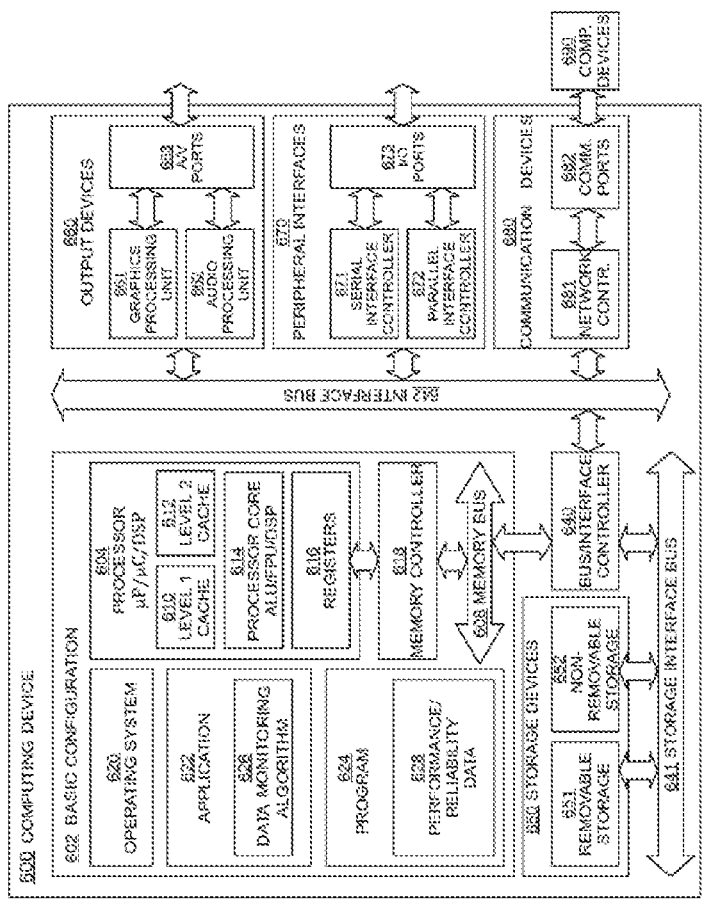
FIG. 6 is a block diagram illustrating an example computing device that is arranged for manufacturing a chip multiprocessor having multiple processor cores, all arranged in accordance with at least some embodiments of the present disclosure.

FIG. 6 is a block diagram illustrating an example computing device 600 that is arranged for manufacturing a chip multiprocessor having multiple processor cores, according to at least some embodiments of the present disclosure. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (μP), a microcontroller (μC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a data monitoring algorithm 626 that is arranged to manage the operating frequencies and voltages assigned to processor cores in a chip multiprocessor, as described with respect to method 300 of FIG. 3 and/or method 400 of FIG. 4. Program data 624 may include performance/reliability data 628 that may be useful for operation with data monitoring algorithm 626 as is described herein. In some embodiments, application 622 may be arranged to operate with program data 624 on operating system 620. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 640 may be used to facilitate communications between basic configuration 602 and one or more data storage devices 650 via a storage interface bus 641. Data storage devices 650 may be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 651 and non-removable storage devices 652 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 660 for facilitating communication from various interface devices (e.g., output devices 642, peripheral interfaces 670, and communication devices 680) to basic configuration 602 via bus/interface controller 640. Example output devices 660 include a graphics processing unit 661 and an audio processing unit 662, which may be configured to communicate to various external devices such as a display or speakers via one or more A/V ports 663. Example peripheral interfaces 670 include a serial interface controller 671 or a parallel interface controller 672, which may be configured to communicate with external devices such as input devices (e.g., keyboard, mouse, pen, voice input device, touch input device, etc.) or other peripheral devices (e.g., printer, scanner, etc.) via one or more I/O ports 673. An example communication device 680 includes a network controller 681, which may be arranged to facilitate communications with one or more other computing devices 690 over a network communication link, such as, without limitation, optical fiber, Long Term Evolution (LTE), 3G, WiMax, via one or more communication ports 682.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

In sum, embodiments of the disclosure provide systems and methods for providing core-level performance or reliability information of processor cores to a CMP containing the processor cores. Incorporation of core-level performance or reliability information into the multicore management process may allow the multicore manager of a CMP to use a wider operating range for each core. This may enhance overall processing power for high-demand tasks and lowers overall power usage for low-demand tasks. Furthermore, it is noted that these improvements may be made with no change to existing chip designs or processes.

There is little distinction left between hardware and software implementations of aspects of systems; the use of hardware or software is generally (but not always, in that in certain contexts the choice between hardware and software can become significant) a design choice representing cost vs. efficiency trade-offs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method to manufacture a chip multiprocessor having multiple processor cores, the method comprising:
    receiving performance or reliability information associated with each of the multiple processor cores, wherein the received performance or reliability information is determined prior to packaging of the chip multiprocessor by testing at least one computing submodule of each of the multiple processor cores; and
    storing the received performance or reliability information such that the stored performance or reliability information is used to adjust an operating parameter of at least one processor core of the multiple processor cores of the chip multiprocessor, wherein the performance or reliability information associated with each of the multiple processor cores comprises, for each of the multiple processor cores, frequency vs. power use information for the at least one computing submodule of each of the multiple processor cores.

2. The method of claim 1, wherein adjusting the operating parameter of the at least one processor core of the multiple processor cores comprises programming a power management unit associated with the chip multiprocessor to optimize power use or clock frequency of the at least one processor core based on the stored performance or reliability information associated with the at least one processor core.

3. The method of claim 2, wherein one of optimizing power use and clock frequency of the chip multiprocessor comprises assigning tasks to one or more of the multiple processor cores based on the stored performance or reliability information associated with the at least one processor core.

4. The method of claim 1, wherein adjusting the operating parameter of the at least one processor core comprises adjusting the voltage or frequency provided to one or more of the multiple processor cores by a power management unit.

5. The method of claim 1, wherein testing the at least one computing submodule comprises testing at least one of: a shifter, an adder, a cache, a bus-processing unit, a network interface, a floating point unit, an arithmetic unit, or a specialty operations unit.

6. The method of claim 1, wherein the frequency vs. power information for the at least one computing submodule includes frequency slope and intercept for power use for the at least one computing submodule.

7. The method of claim 1, wherein storing the received performance or reliability information comprises recording the performance or reliability information to an on-chip registry of the chip multiprocessor.

8. The method of claim 1, wherein storing the received performance or reliability information comprises storing the received performance or reliability information in a database accessible by a power management unit associated with the chip multiprocessor.

9. The method of claim 1, wherein storing the received performance or reliability information comprises storing the received performance or reliability information for the at least one processor core on the at least one processor core.

10. The method of claim 1, wherein adjusting the operating parameter of the at least one processor core of the multiple processor cores comprises determining one of a power rating, a frequency, and an operating voltage of the at least one processor core of the multiple processor cores based on the received performance or reliability information associated with the at least one processor core.

11. The method of claim 10, wherein the power rating comprises one of an average power consumption and a peak power consumption of the at least one processor core.

12. A method to manage frequency and voltage provided to processor cores in a chip multiprocessor, the method comprising:
    determining computational requirements for a task to be completed by the chip multiprocessor, the computational requirements being based on make-up of the task; and
    based on the determined computational requirements and on stored performance or reliability information associated with each of the processor cores, adjusting an operating parameter of at least one processor core of the processor cores of the chip multiprocessor, wherein the stored performance or reliability information associated with each of the processor cores;
        is determined prior to packaging of the chip multiprocessor by testing at least one computing submodule of each of the processor cores, and
        comprises, for each of the processor cores, frequency vs. power use information for the at least one computing submodule of each of the processor cores.

13. The method of claim 12, wherein adjusting the operating parameter of the at least one processor core of the processor cores comprises optimizing power use or clock frequency of the at least one processor core based on the stored performance or reliability information associated with the at least one processor core.

14. The method of claim 13, wherein one of optimizing power use and clock frequency of the chip multiprocessor comprises assigning tasks to one or more of the processor cores based on the stored performance or reliability information associated with the at least one processor core.

15. The method of claim 14, wherein assigning the tasks to the one or more of the processor cores comprises assigning the tasks to at least one of a first processor core and a second processor core based on execution instructions contained in the tasks.

16. The method of claim 15, further comprising weighting a task in categories of instructions performed by each computing submodule of each of the first processor core and the second processor core.

17. The method of claim 12, wherein the stored performance or reliability information is disposed in an on-chip registry of the chip multiprocessor.

18. The method of claim 12, further comprising:
  based on the stored performance or reliability information associated with the processor cores, selecting a processor core from the processor cores in the chip multiprocessor; and
  preventing the processor core from performing the task,
  wherein the stored performance or reliability information is determined prior to packaging of the chip multiprocessor.

19. A chip multiprocessor formed on a single die, the chip multiprocessor comprising:
  a first processor core formed on the die;
  a second processor core formed on the die; and
  an on-chip registry formed on the die and configured with performance or reliability information associated with the first processor core and performance or reliability information associated with the second processor core, wherein the performance or reliability information associated with the first processor core comprises frequency vs. power use information for at least one computing submodule of the first processor core, that is determined by testing the at least one computing submodule of the first processor core prior to packaging of the chip multiprocessor, and the performance or reliability information associated with the second processor core comprises frequency vs. power use information, for at least one computing submodule of the second processor core, that is determined by testing the at least one computing submodule of the second processor core prior to packaging of the chip multiprocessor.

20. The chip multiprocessor of claim 19, wherein the on-chip registry comprises a registry disposed in the first processor core and a registry disposed in the second processor core.

* * * * *

UNITED STATES PATENT AND TRADEMARK OFFICE
CERTIFICATE OF CORRECTION

PATENT NO.           : 9,619,240 B2
APPLICATION NO.      : 13/811280
DATED                : April 11, 2017
INVENTOR(S)          : Kruglick Page 1 of 1

It is certified that error appears in the above-identified patent and that said Letters Patent is hereby corrected as shown below:

In the Specification

In Column 1, Line 9, delete "§371" and insert -- § 371 --, therefor.

In the Claims

In Column 16, Line 39, in Claim 12, delete "cores;" and insert -- cores: --, therefor.

In Column 18, Line 3, in Claim 19, delete "information" and insert -- information, --, therefor.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*